F. S. ANDERSON.
AUTOMATIC SPRINKLER SYSTEM.
APPLICATION FILED APR. 29, 1920.
1,404,827.   Patented Jan. 31, 1922.
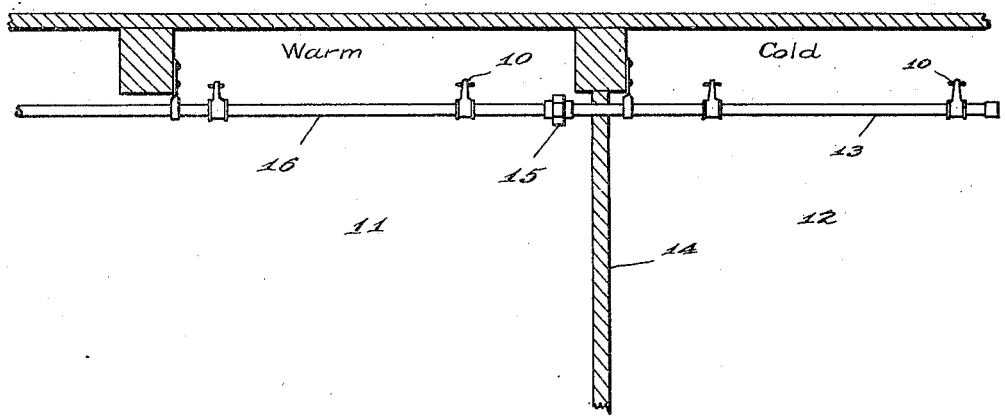
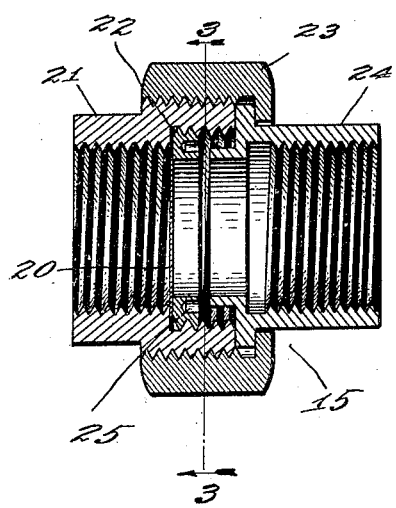
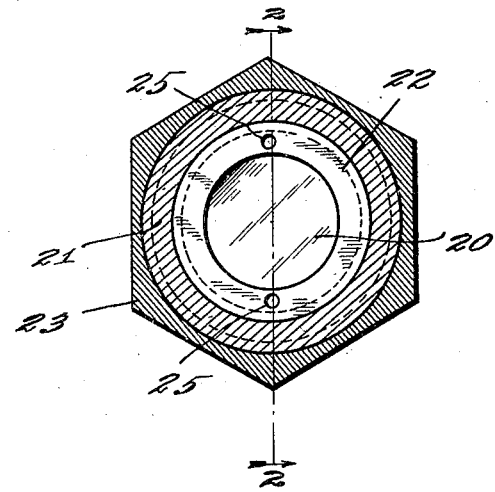
Inventor
Fred Sansom Anderson,
By Hood Selby.
Attorneys

UNITED STATES PATENT OFFICE.

FRED SANSOM ANDERSON, OF RICHMOND, INDIANA.

AUTOMATIC SPRINKLER SYSTEM.

1,404,827. Specification of Letters Patent. Patented Jan. 31, 1922.

Application filed April 29, 1920. Serial No. 377,590.

*To all whom it may concern:*

Be it known that I, FRED S. ANDERSON, a citizen of the United States, residing at Richmond, in the county of Wayne and State of Indiana, have invented a new and useful Automatic Sprinkler System, of which the following is a specification.

In the operation of automatic sprinkler systems, considerable difficulty has been experienced when the systems are used in places where temperatures below freezing may occur, as the water freezes in the pipes and bursts them. It has been proposed to use in the sprinkler pipes in such cold places liquids having lower freezing points, such as a solution of calcium chloride; but difficulty has been experienced by the mixing of the calcium chloride solution with the water in the remainder of the sprinkler piping, even when it has been attempted to separate the two by U-tubes or check valves between the pipes which respectively contain the water and the calcium chloride solution. This results in a very short time in the dilution of the calcium chloride solution to such a point that it freezes easily; and also in the distribution of calcium chloride throughout the whole system of piping, with its resultant corrosive effects on such pipes.

It is the object of my present invention to provide an arrangement which will keep the calcium chloride solution and the water entirely separate, but which upon the occurrence of a fire and the opening of one of the sprinkler heads will allow the water to force out the calcium chloride solution and flow through the pipes which normally contain such solution.

In accomplishing this result, I use in the pipes which may be subjected to low temperatures a suitable solution which will not freeze at such temperatures, such as the calcium chloride which has already been proposed, and connect the pipe containing the calcium chloride solution to the pipe containing the water under pressure by a suitable fitting in which is a diaphragm which effectively separates the water from the calcium chloride solution, which diaphragm is rupturable upon excess of pressure on one side, so that when a sprinkler head in the pipe containing the calcium chloride solution is opened, as by a fire, the pressure on the calcium chloride side of the diaphragm is relieved, and the pressure of the water on the other side of such diaphragm bursts it to allow the water to pass.

The accompanying drawing illustrates my invention: Fig. 1 is a rather diagrammatic view showing the general arrangement of the system; Fig. 2 is a longitudinal section on the line 2—2 of Fig. 3 through a pipe union containing a replaceable rupturable diaphragm; and Fig. 3 is a section on the line 3—3 of Fig. 2.

The automatic sprinkler system has the usual sprinkler heads 10 located at suitable intervals in the distributing pipes which extend throughout the building, in both warm places 11 and in places 12 which may become cold, such as unheated sheds. The pipe 13 in the cold places 12 passes through the partition 14 separating the cold and warm places, and on the warm side of such partition is connected by a suitable union 15 to the pipe 16 containing the water under pressure, which may be supplied from any suitable source, such as a city water system.

In the union 15 is mounted a rupturable diaphragm 20, which may be made of various substances. I have found mica to be very suitable for the diaphragm, as after rupturing it does not clog up the sprinkler heads 10. This diaphragm is clamped in one part 21 of the union by an internal screw-threaded ring 22, having a screw-threaded mounting in such union part 21 and clamping the diaphragm 20 between itself and a suitable internal shoulder in such union part 21. The remainder of the union is standard, comprising the outer hexagonal member 23 which clamps the union part 21 to the mating union part 24. By separating the two union parts the internal ring 22 is rendered accessible, so that it may be unscrewed by a suitable wrench having pins which fit into holes 25 provided in such internal ring.

In operation, the pipe 13 is filled with a calcium chloride solution, and the pipe 16 connected to the water system, the diaphragm 20 being in place in the union 15 connecting the pipes 13 and 16. The diaphragm 20 is impervious, and effectively separates the water and the calcium chloride solution which are on opposite sides of it. The calcium chloride solution permits the pipe 13 to be subjected to very low temperatures without freezing. In case of fire which causes one of the sprinkler heads 10 connected to the pipe 13 to open, the calcium chloride is allowed to escape, relieving the pressure on the calcium chloride side of the diaphragm 20, so that the pressure of the water in the pipe 16 will rupture such diaphragm, and water will be permitted to flow through the union 15 and into the pipe 13, to force out the calcium chloride ahead of it through the opened sprinkler head, and to follow such solution through such sprinkler head and play on the fire in the usual manner of automatic sprinkler systems.

I claim as my invention:

1. In an automatic sprinkler system, the combination of a pipe connected to a source of water supply under pressure and provided with automatic sprinkler heads, a rupturable diaphragm located in said pipe and separating it into two divisions, the pipe on that side of the diaphragm which is remote from the source of water pressure containing a liquid having a low freezing point.

2. In an automatic sprinkler system, the combination of a pipe provided with automatic sprinkler heads and located in a place which may be subjected to cold, said pipe extending from said place into a place which is normally kept above the freezing point of water, a second pipe joined to the first in said place in which the temperature is above the freezing point of water and connected to a source of water supply under pressure, and a rupturable diaphragm at the junction of said two pipes, said first pipe containing a liquid having a freezing point lower than that of water.

3. In an automatic sprinkler system, the combination of a pipe provided with automatic sprinkler heads and located in a place which may be subjected to cold, a second pipe joined to the first and connected to a source of water supply under pressure, and a rupturable diaphragm at the junction of said two pipes, said first pipe containing a liquid having a freezing point lower than that of water.

4. In an automatic sprinkler system, the combination of a pipe provided with automatic sprinkler heads and located in a place which may be subjected to cold, a second pipe connected to a source of water supply under pressure, a separable union connecting said two pipes, and a rupturable diaphragm replaceably mounted in said union, said first pipe containing a liquid having a freezing point lower than that of water.

In witness whereof I have hereunto set my hand at Richmond, Indiana, this 15th day of April, A. D. one thousand nine hundred and twenty.

FRED SANSOM ANDERSON.